United States Patent
Bruso et al.

(10) Patent No.: US 9,514,325 B2
(45) Date of Patent: Dec. 6, 2016

(54) SECURED FILE SYSTEM MANAGEMENT

(71) Applicants: Kelsey L Bruso, Roseville, MN (US); Uday Datta Shet, Bangalore (IN)

(72) Inventors: Kelsey L Bruso, Roseville, MN (US); Uday Datta Shet, Bangalore (IN)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 14/486,238

(22) Filed: Sep. 15, 2014

(65) Prior Publication Data

US 2016/0078243 A1   Mar. 17, 2016

(51) Int. Cl.
*G06F 7/04* (2006.01)
*G06F 21/62* (2013.01)
*H04L 29/06* (2006.01)

(52) U.S. Cl.
CPC ......... *G06F 21/6218* (2013.01); *H04L 63/102* (2013.01)

(58) Field of Classification Search
CPC .................................................. G06F 21/6218
USPC .......................................................... 726/27
See application file for complete search history.

(56) References Cited

U.S. PATENT DOCUMENTS

| | | | |
|---|---|---|---|
| 2004/0015723 A1* | 1/2004 | Pham ..................... | H04L 63/10 726/27 |
| 2008/0072035 A1* | 3/2008 | Johnson .............. | H04L 63/0428 713/153 |
| 2010/0306530 A1* | 12/2010 | Johnson ................ | G06F 21/335 713/155 |
| 2012/0030242 A1* | 2/2012 | Nakamura .......... | G06F 21/6218 707/781 |
| 2013/0167118 A1* | 6/2013 | Borgianni ......... | G06F 17/30876 717/121 |

* cited by examiner

*Primary Examiner* — Teshome Hailu
(74) *Attorney, Agent, or Firm* — Robert P. Marley

(57) ABSTRACT

Systems and methods for establishing a secure file system are disclosed, in which system endpoints such as files and directories in a file system are protected using a security appliance. The security appliance protects each endpoint in the file system from unauthorized access by making those endpoints invisible to unauthorized users. The security appliance organizes users and endpoints into various communities of interest (COI). A user COI groups users such that all users associated with that particular COI have authorization to view the same one or more endpoints located in file storage.

11 Claims, 11 Drawing Sheets

SECURED FILE SYSTEM MANAGEMENT

TECHNICAL FIELD

The present disclosure relates generally to file systems. In particular, the present disclosure relates to mechanisms for securing a file system via a file system manager.

BACKGROUND

File systems generally utilize a file system manager that may be included in an operating system, and provides access to files and/or directories that are managed in that file system. Such file system managers have some abilities to protect the data stored within the respective file systems. For example, an Access Control List or an Access Control Record associated with a directory or a file can be used to control whether a user may have read or write access to a directory or a file. Using such mechanisms, file access requests are received by a file system manager and from a caller (typically an application associated with a particular user or endpoint). The file access request may identify one or more directories and a file, and may determine that the caller does not have an appropriate access right (e.g., read or write access) associated with the file access request. The Access Control List or Record is accessed to determine if the caller has access rights to the file based on the request (e.g., read or write access). If the caller has adequate access rights, the file system manager may return a file handle to the caller for use. If the caller does not have adequate access rights, an error message is returned to the caller. In either case, the file or directory is visible to the user.

Existing file system manager capabilities have shortcomings with respect to protecting a directory or file from unauthorized access. For example, existing file system managers allow all users who can access a directory, using a user credential such as a user identification and password, to see all the directories and files included in that particular directory to which the user has access. Such knowledge of the presence or absence of a directory or file can be valuable to a hacker or an unauthorized user (e.g., due to names of files or directories, which may be indicative of contents or the value thereof). Accordingly, improvements in the area of file system manager security are desirable.

SUMMARY

In general terms, this disclosure is directed to a system for protecting individual endpoints, such as files and directories, within a file system by making those endpoints invisible to unauthorized users.

In a first embodiment, a method for processing file system requests using a file server is provided. The method includes receiving a file system request and a user identification associated with the file system request from a caller, wherein the file system request includes a path identifying an existing directory; obtaining a community of interest (COI) credential associated with the user identification and identifying the existing directory in the path. The method further includes determining whether at least one COI included in the COI credential matches at least one COI associated with the existing directory; and assessing visibility of the existing directory to the caller based on a COI associated with the existing directory; wherein: if at least one COI included in the COI credential matches at least one COI associated in the directory, assessing visibility of the existing directory includes assessing user access permission to the existing directory; and if no COI included in the COI credential matches a COI associated in the existing directory, assessing visibility of the existing directory includes returning an indication, to the caller, that the existing directory does not exist.

In a second embodiment, a method for processing file system requests using a file server is disclosed. The method includes receiving a file system request and a user identification associated with the file system request from a caller, wherein the file system request includes a path including one or more existing directories and an existing file; and obtaining a community of interest (COI) credential associated with the user identification. For each directory in the path, the method includes: identifying the directory in the path; determining whether at least one COI included in the COI credential matches a COI associated with the directory; and assessing visibility of the directory to the caller based on a COI associated with the directory. The method further includes identifying the file in the path; determining whether at least one COI included in the COI credential matches a COI associated with the file; and assessing visibility of the file to the caller based on the COI associated with the file. If at least one COI included in the COI credential matches a COI associated in the file, assessing visibility of the file includes assessing user access permission to the file; and if no COI included in the COI credential matches a COI associated in the file, assessing visibility of the file includes returning an indication, to the caller, that the existing file does not exist.

In a third embodiment, a system for processing file system requests is disclosed. The system comprises: a file server having a file storage and a file system manager, the file storage for storing one or more directories and files. The file system manager performs the steps of: receiving a file system request and a user identification associated with the file system request from a caller, wherein the file system request includes a path identifying an existing directory; obtaining, from a stealth appliance that is separate from the file server, a community of interest (COI) credential associated with a user identification. The file system manager further performs the steps of identifying the directory in the path; determining whether at least one COI included in the COI credential matches a COI associated with the directory; assessing visibility of the directory to the caller based on the COI associated with the directory; wherein: if at least one COI included in the COI credential matches a COI associated in the directory, assessing user access permission to the directory; and if no COI included in the COI credential matches a COI associated in the directory, returning an indication, to the caller, that the existing directory does not exist.

In a fourth embodiment, a method for accessing files in a file server by a caller is disclosed. The method comprises issuing, to a file system manager of a file server, a file system request and an identification of the caller, wherein the file system request includes a path identifying an existing file in an existing directory; and receiving a response from the file system manager indicative of visibility of the existing file to the caller based on an assessment of whether the caller is a member of a community of interest associated with at least one of the existing file and the existing directory.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
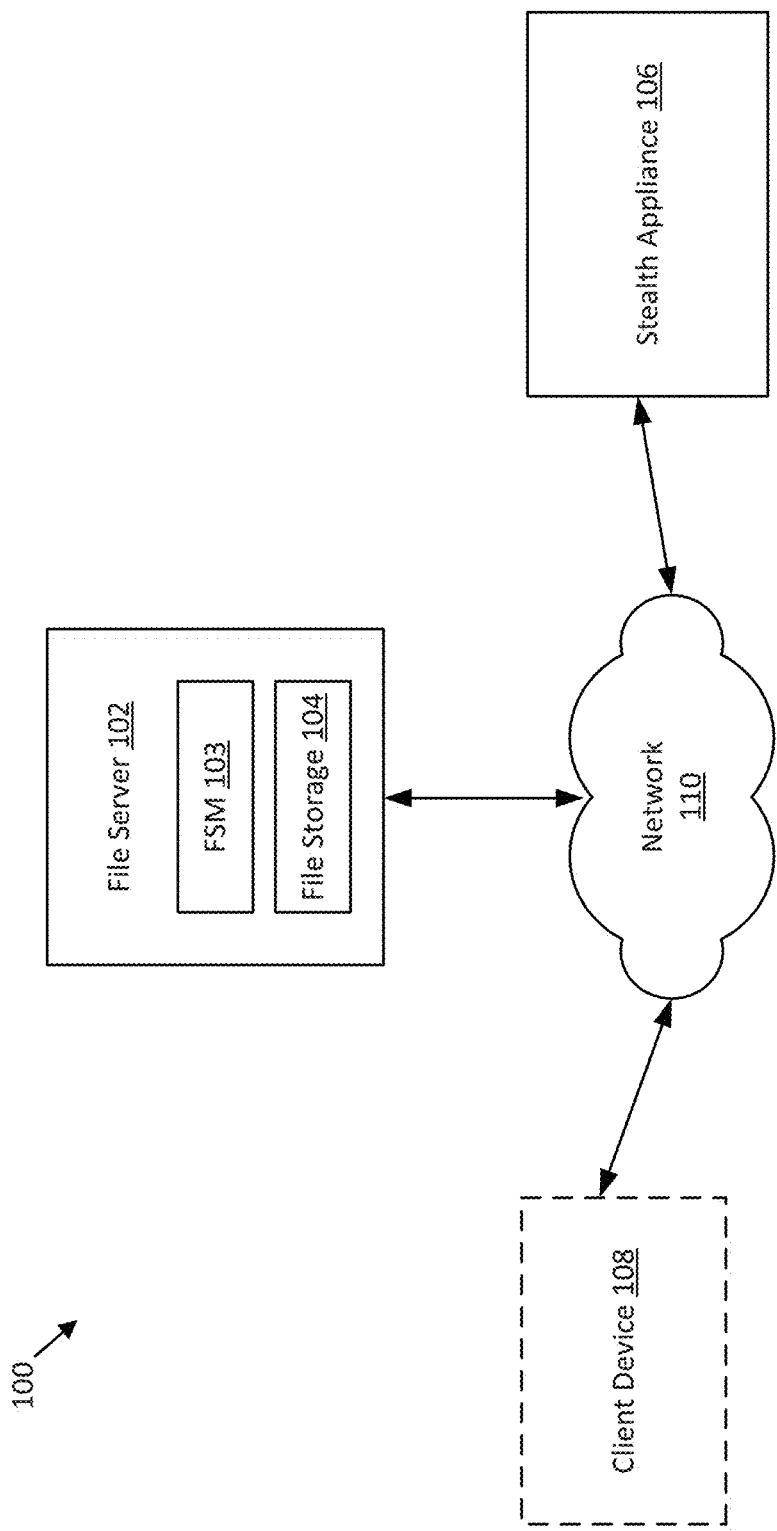
FIG. 1 is a system block diagram of a network in which aspects of the present disclosure can be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure relates to methods and systems for establishing a secure file system in which system objects (e.g., files or directories), referred to herein as endpoints, are protected using a security appliance. In part, the security appliance protects each endpoint in a file system from unauthorized access by making those endpoints invisible to unauthorized users. Accordingly, only authorized users can view and access a particular endpoint. Still further, using the embodiments of the present disclosure, only authorized users can access an endpoint directory, but such authorized users may be unable to view, and therefore unable to access, one or more endpoints contained in that particular directory. Accordingly, although an authorized user can access a directory, the authorized user is not automatically authorized to view and access other endpoints contained therein. In sum, an authorized user is only allowed to view and access those endpoints in a file system to which that user has access and is correspondingly unaware of the presence or absence of particular endpoints in the system.

Referring now to FIG. 1, a block diagram illustrating a system 100 is shown including a file server 102 having file storage 104. The file server 102 is in communication with a security appliance 106 and a client device 108 over a network 110, such as the internet or any LAN, WAN, or other data network.

The file server 102 is, in example embodiments, a server device that is communicably connected to the network. The file server 102 includes file storage 104 such as a Storage Area Network (SAN). In an example embodiment, the file storage 104 organizes endpoints in a hierarchical structure wherein files are organized under directories and possibly sub-directories. An example organizational structure of a file storage device 104 within the file server 102 is shown and described in further detail with reference to FIG. 4.

In the embodiment shown, the file server 102 includes a file system manager 103 that manages access to the file storage 104. In various embodiments, the file system manager 103 manages file storage and maintains the file and directory structure of the file storage 104. The file system manager 103 can, for example, manage access rights to the file storage for various users or user groups, and can, in some embodiments receive and manage commands that may be issued by a user or application to access the file storage. In some such embodiments, the file system manager 103 can receive POSIX-compliant commands or other analogous types of commands. Accordingly, in such embodiments, the file system manager 103 may include read/write/execute access permissions (controls) on files, but may lack capabilities to obscure files and/or directories from a caller. In other words, such a file system manager typically provides access controls to directories and files, but does not prevent unauthorized users from viewing such endpoints.

In the embodiment shown, the security appliance 106 is a device such as a server or storage device that manages security of other systems within a network. In example embodiments, the security appliance 106 applies Stealth security and encryption, available from Unisys Corporation of Blue Bell, Pa.

In some embodiments, the security appliance 106 includes a management application that organizes users and endpoints into various communities of interest (COI). A user COI groups users such that all users associated with that particular COI have authorization to view the same one or more endpoints located in file storage 104. An endpoint can be associated with one or more user COIs, to define the users or user groups that have authorization to access that particular endpoint. A match between the user COI associated with a caller and one of the COIs associated with an endpoint authorizes the user to access that endpoint. If the requesting user's COI does not match any COI associated with the endpoint (file or directory), the file server ensures that the endpoint is hidden from the requesting user. A user may belong to many COIs, and an endpoint can be associated with many different user COIs. Hence, users across multiple COIs may be granted access to a particular endpoint. Accordingly, a user may belong to a particular COI that does not match one particular COI associated with the endpoint, but the user may additionally belong to another COI that does match a COI associated with an endpoint, thereby providing that user with authorization to access that particular endpoint. The security appliance 106 stores, for each user, a COI credential identifying one or more COIs to which the user belongs, user identification and password information, and a COI key used for decryption, as will be described in further detail below.

In the embodiment shown, the client device 108 is a computing device that is controlled by a user to access endpoints in file storage 104 of the file server 102. As shown in the system 100, the client device 108 is a device that is separate from, and communicable over the network 110 to, the file server 102. Accordingly, as shown, the client device 108 may be located anywhere with the capability to remotely connect to the file server 102 over the network 110. In other embodiments, the client device 108 is located on the file server 102. In either case, a user credential may be required to access files on the file server. Such user credentials may be, in various embodiments, a user identification and password, a Kerberos ticket, or an Active Directory access token that otherwise gives a user access to a computing system endpoint (rather than a file or directory endpoint as that term is used herein).

Figure 2:
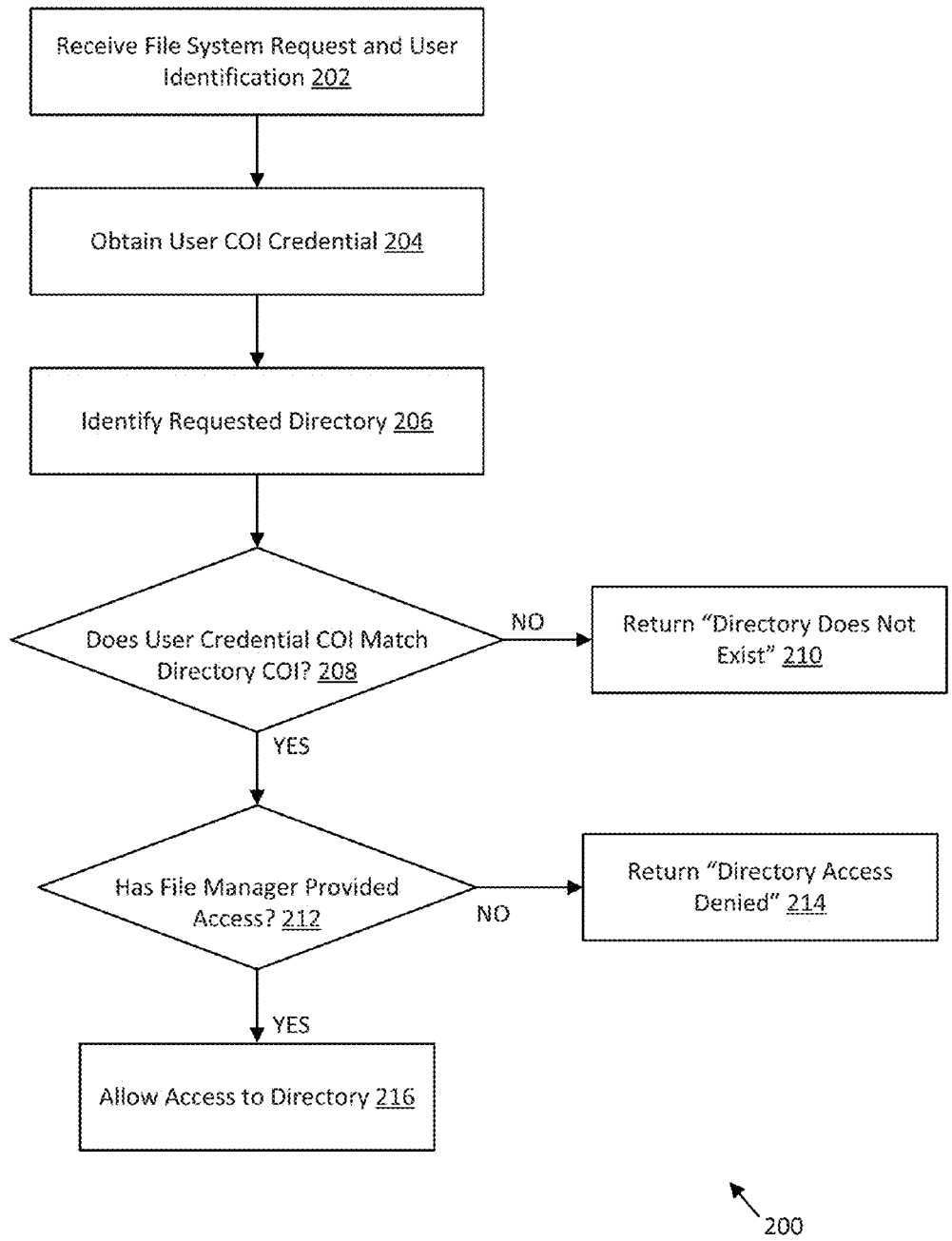
FIG. 2 is an example method for processing file system requests using a file server.

FIG. 2 illustrates a flowchart of a method 200 for processing file system requests using a file server, such as file server 102 of FIG. 1, according to an example embodiment. In the method 200, the file server 102 processes file system requests, such as directory endpoint requests. Such requests can be provided to, and managed by, a file system manager, such as file system manager 103 of FIG. 1.

In the method 200, a file server receives a file system request and a user identification from a client in a request receipt operation 202. For example, a user seeking to access a directory sends, for example using the client device 108, a file system request and an associated user identification and password to the file server. The file system request identifies the location of the directory to which the user seeks access. The file system request may be a structured character string that is in the form of a path, such as, for example: ROOT/DIR-12/. Such a file system request illustrates that the user seeks to access Directory 12. In alternative embodiments, the file system request can be made by a user application at the file server itself, or manually by a user that is provided a prompt from which the file system manager can receive commands. As such, in the present application, file system requests are referred to as being received from a caller, which refers to the user or application from which the file system request originates, regardless of location.

In a credential retrieval operation 204, the file server obtains the user's COI credentials from a security appliance, such as security appliance 106 of FIG. 1. This can include, for example, a plurality of COI keys that each define the user's membership in a different COI. In particular, the file server passes the user identification and password, or other credentials received in request receipt operation 202 to the security appliance and obtains the user's COI credentials, which identify one or more COIs to which the user belongs. In some cases, the user or caller belongs to zero COIs and has visibility to no file system directories or files.

In the embodiment shown, a directory operation 206, the file server identifies the requested existing directory from the path. In the example above, the identified directory is DIR-12 in the path ROOT/DIR-12. In embodiments, the path contains multiple directories, in which case the file server initially identifies the first directory in the path and performs COI matching, as explained herein, for the first directory, and thereafter continues to proceed through each sub-directory in the path, identifying and performing COI matching for each directory individually. It is noted that this example embodiment presumes that the requested directory exists. If the requested directory does not exist in file storage (e.g., file system 104), the file system manager returns an error message to the user. In embodiments, the error message indicates that the directory does not exist and yet in other embodiments, the error message simply indicates that an error has occurred.

In a COI assessment operation 208, the file server determines whether at least one COI included within the user's COI credential matches at least one COI associated with the directory. As described herein, the COI(s) associated with a particular endpoint such as a directory or a file define which COIs, and hence all users who belong to those COIs, have authority to access and view the endpoint. The file system retrieves the COI information for the referenced directory endpoint that may be stored with directory metadata maintained by the file server, in an authorization service, or in another secure location that is accessible only to the file server. Once the COI information for the directory endpoint is retrieved, the file system determines whether at least one COI associated with the directory endpoint matches at least one COI to which the user belongs, which is stored in the user's COI credentials obtained in credential retrieval operation 204. If no COI contained in the user COI credential matches a COI associated with the directory endpoint, then in a directory COI mismatch operation 210 the file server returns a message indicating the directory does not exist. If, however, at least one COI contained in the user COI credential matches a COI associated with the directory endpoint, then the file server proceeds to a directory access operation 212.

In directory access operation 212, the file server determines whether the user has at least read-only access to the requested directory, as defined and managed by the file system manager. Directory permissions may be set by the system administrator, and these permissions may be stored in file storage or elsewhere in the file server. If the file server determines that the file manager did not provide the user with at least read only access, an access denied operation 214 causes the file system manager of the file server to return a message indicating that the directory access is denied. However, if the file system manager determines that the user has at least read only access, in access operation 216 the file server provides access to the directory to the caller. In some embodiments, this access is read only access and in other embodiments, the access provides the user with read and write capability, or capabilities to delete, modify, copy, or other operation types. In example embodiments, access operation 216 can return a directory handle to the caller, or can otherwise simply determine that directory access is available, for example if performed in the context of a file system request seeking access to a file within the directory, as noted below in connection with FIG. 3.

Referring to FIG. 2 generally, it is noted that, in example embodiments in which a caller submits a file system request that identifies a directory that resides within another directory, the method 200 can be performed iteratively to determine whether, for each directory, a caller has access to the next level directory. At each level, if a user COI does not match a COI associated with a directory, that directory will not appear to exist to the caller, resulting in the directory COI mismatch operation 210 occurring in response to a directory endpoint request or other type of file system request that identifies a particular directory.

Figure 3:
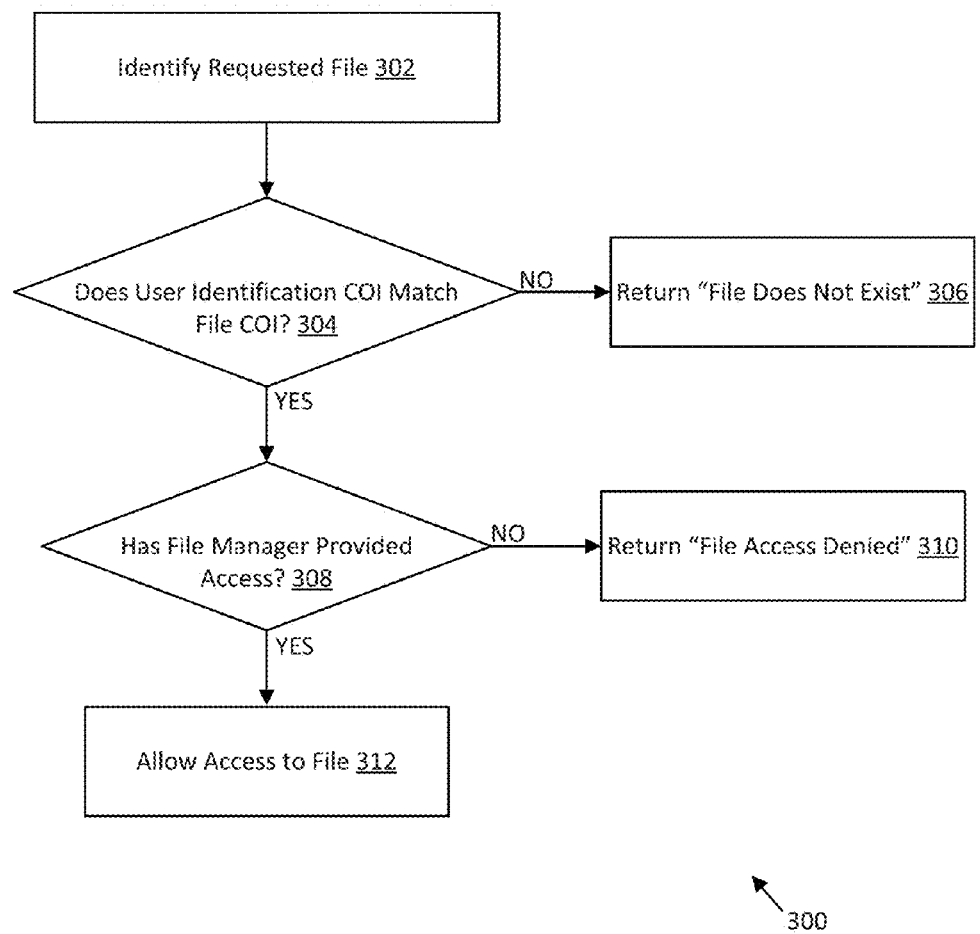
FIG. 3 is a second example method for processing file system requests using a file server.

Referring now to FIG. 3, a flowchart of an example method 300 for processing file system requests using a file server, such as file server 102 of FIG. 1, is shown. In the method 300, the file server processes file endpoint requests, which identify a file and optionally identify one or more directories within which the file is located. Such file endpoint requests also correspond to file system requests, as that term is used in the present application. In particular, each file endpoint is organized within a directory endpoint. Accordingly, in order to process file system requests for a file endpoint, it is presumed that the file system manager of the file server first determines whether a user has access to the directory in which the requested file is located. Accordingly, the file server performs the steps illustrated in method 200, which is described herein with reference to FIG. 2, to determine whether a caller has access to a particular directory location at which a file may be stored. Once the file server determines that the user has access to the particular directory in which the file is located, the method 300 begins at step 302. In a file identification operation 302, the file server identifies the requested existing file from the path.

Continuing the example as described in FIG. 2, the full path may be defined as: ROOT/DIR-12/FILE-4. Accordingly, the identified file is FILE-4. It is noted that this example embodiment presumes that the requested file exists. If the requested file does not exist in file storage, the file server returns an error message to the user. In embodiments, the error message indicates that the file does not exist and yet in other embodiments, the error message indicates no more than an error has occurred.

In a COI assessment operation 304, the file server determines whether at least one COI included within the user's COI credential matches at least one COI associated with the file. The file system retrieves the COI information for the referenced file endpoint, which may be stored with file metadata maintained by the file server, in an authorization service managed by a security appliance (e.g., security appliance 106 of FIG. 1), or in another secure location that is accessible to the file server. Once the COI information for the file endpoint is retrieved, the file system determines whether at least one COI associated with the file endpoint matches at least one COI to which the user belongs, which is stored in the user's COI credentials. The user's COI credentials can be obtained, for example, in credential retrieval operation 204 of the method 200 described in FIG. 2, or alternatively, if no directory is identified, using a corresponding credential retrieval operation during operation of method 300.

If no COI contained in the user COI credential matches a COI associated with the file endpoint, in a file COI mismatch operation 306 the file system manager of the file server returns a message indicating the file does not exist. If, however, at least one COI contained in the user COI credential matches a COI associated with the file endpoint, a the file server 102 proceeds to a file access operation 308.

In the file access operation 308, the file server determines whether the user has been provided with at least read-only access to the requested file, for example using traditional POSIX-based permissions included in the file system manager. File permissions may be set by the system administrator, and these permissions may be stored in file storage or elsewhere in the file server. If the file system manager determines that the user lacks even read only access to the requested file, in a file access denied operation 310, the file server returns a message to the caller indicating that the file access is denied. However, if the file system manager determines that the user has at least read only access, in an access operation 312 the file system manager of the file server allows access to the file. In some embodiments, this access is read only access and in other embodiments, the access provides the user with read and write capability. The access can be provided, for example, by returning a file handle to the caller, which can subsequently issue read/write or other file access operations on the file based on the received file handle.

It is noted that although in the example shown a file is ultimately accessed, in alternative embodiments other types of file system requests could be handled. For example, in some such embodiments, accessing symbolic links and other file system structures, similar to the method for accessing files, could be accomplished using an analogous process.

Figure 4:
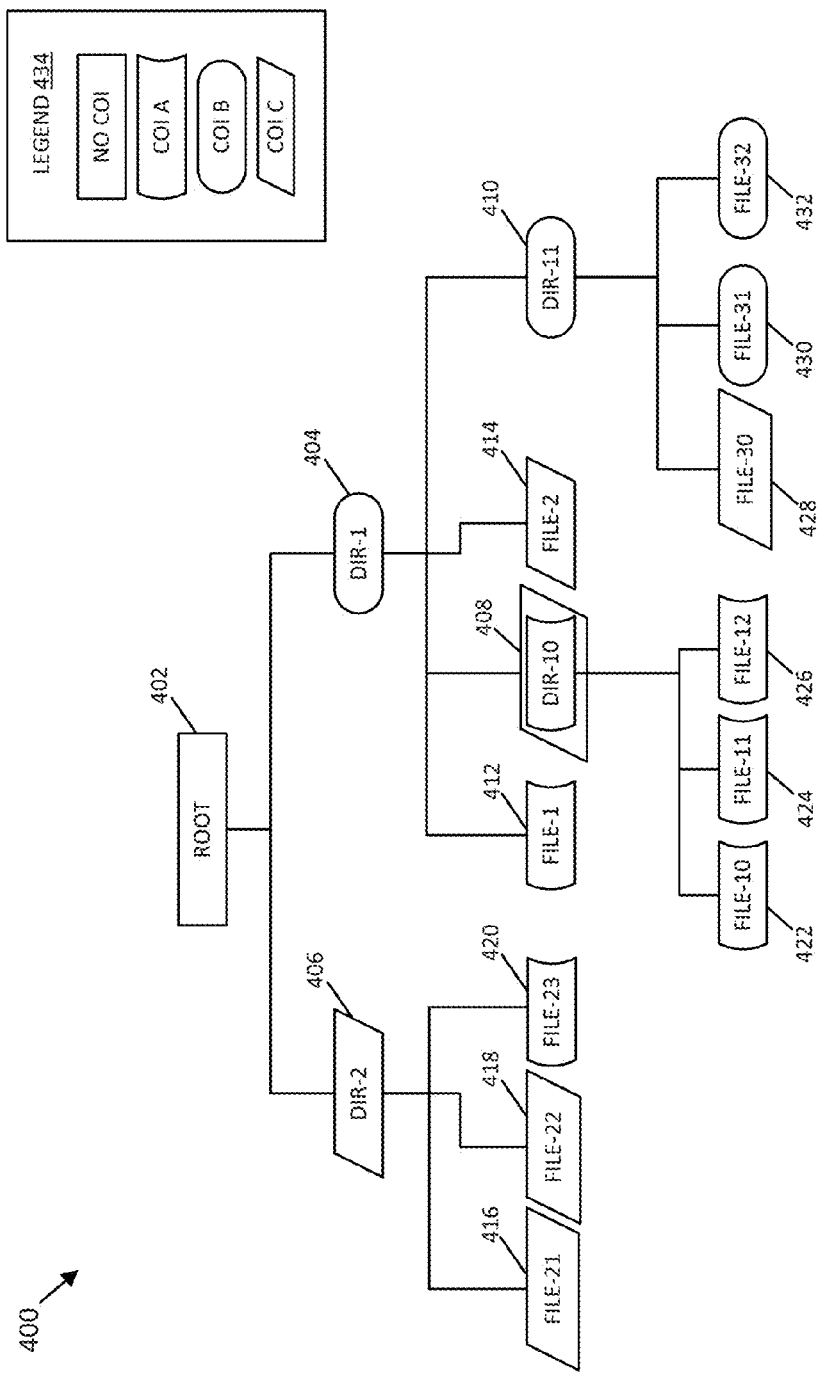
FIG. 4 is an example file system including files arranged within directories and sub-directories.

FIG. 4 is an example file system 400 including files arranged within directories and sub-directories. As shown, the file system 400 is populated with the directories ROOT 402, DIR-1 404, DIR-2 406, and sub-directories DIR-10 408 and DIR-11 410. Files are arranged within each of the directories and sub-directories. As shown in the legend 434, there are three example COIs: COI A, COI B, and COI C, each of which are represented by a separate symbol. As shown, each of the files and directories in file structure 400 are represented by at least one symbol indicating the COI(s) to which the particular endpoint belongs. For example, DIR-10 408, FILE-1 412. FILE-23 420, FILE-10 422, FILE-11 424, and FILE-12 426 belong to COI A. DIR-1 404, DIR-11 410, FILE-31, and FILE-32 belong to COI B. DIR-2 406, DIR-10 408, FILE-21 416, FILE-22 418, FILE-2 414, and FILE-30 428 belong to COI C. Note that DIR-10 408 belongs to both COI A and COI C.

In an example, if a user belongs only to COI B, the user has access to DIR-1 404, DIR-11 410, FILE-31 430, and FILE-32 432. Alternatively, if a user belongs to COI A and COI B, the user has to access directories DIR-1 404, DIR-10 408, DIR-11 410 as well as files FILE-1 412, FILE-10 422, FILE-11 424, FILE-12 426, FILE-31 430, and FILE-32 432. The user, however, does not have access to directory DIR-2 406 nor files FILE-21 416 or FILE-22 418 because those endpoints belong exclusively to COI C in this example. Although the user belongs to COI A, the user does not have access to FILE-23 420, which also belongs to COI A because the user does not have access to DIR-2 406 in which FILE-23 is included.

In the context of FIG. 1, the file server 102, and in particular file system manager 103, processes file access requests using the methods as described in FIGS. 2 and 3. In an example implementation of methods 200 and 300 and file structure 400, the file server 102 receives a file system request and user credentials from a caller (a user identification and associated password from a client device 108 (request receipt operation 202). The request includes the path ROOT/DIR-2/FILE-22. The file server 102, using the user identification and password, obtains the user COI credential from the security appliance 106, wherein the user COI credential indicates the user belongs to COI B and COI C (credential retrieval operation 204).

The file server 102 thereafter analyzes the path to identify the directory or file the user wishes to access. In the example, the file server 102 individually and sequentially analyzes each endpoint in the path ROOT/DIR-2/FILE-22 to determine whether at least one COI to which the user belongs matches at least one COI associated with each endpoint. First the file server 102 identifies the requested directory in the path (directory operation 206). In this example, the requested directory is DIR-2 406. Because the user belongs to COI C, which is also the COI with which DIR-2 406 is associated, the file server 102 makes a positive determination that at least one COI to which the user belongs matches the COI associated with DIR-2 406 (COI assessment operation 208). Next, the file server 102 determines whether the file manager provided the particular user with at least read only access to DIR-2 406 (directory access operation 212). In this example embodiment, the file server 102 determines that the file manager has provided at least read only access and therefore the user is provided with access to DIR-2 (access operation 216).

Next, the file server 102 analyzes the path ROOT/DIR-2/FILE-22 and identifies FILE-22 418 as the requested file in the path (file identification operation 302). Because the user and FILE-22 418 both belong to COI C, the file server 102 makes a positive determination that at least one COI to which the user belongs matches the COI associated with FILE-22 418 (COI assessment operation 304). The file server 102 determines whether the file manager provided the particular user with at least read only access to FILE-22 418 (file access operation 308). In this example embodiment, the file server 102 determines that the file manager has provided at least read only access and therefore the user is provided with access to FILE-22 418 (access operation 312).

Alternatively, if the requested path was ROOT/DIR-2/FILE-23, the file server 102 would determine that there is no COI to which the user belongs that matches at least one COI associated with FILE-23 420 (i.e., no match because the user belongs to COI B and COI C and FILE-23 420 belongs only to COI A). Accordingly, the file server returns a message indicating the file does not exist (file COI mismatch operation 306). As such, the disclosed system provides robust protection from unauthorized access by making endpoints invisible to unauthorized users. In this example, although the user does have access to DIR-2 406 via membership in COI C, that user does not have access to FILE-23 420. The same user would not have access to DIR-10 408 or files within that directory.

One common action for a file system is to request a list of the contents of a directory. Referring to FIG. 4, in one example, a user may belong to COI B and request a list of the contents of directory ROOT/DIR-1. The file server 102 determines that the user does have access to directory DIR-1 404. Next, the file server 102 determines if the user with COI B has access to FILE-1 412, DIR-10 408, FILE-2 414, and DIR-11 410. The file server 102 determines that the user has access only to DIR-11 410. The list of contents for ROOT/DIR-1 returned by file server 102 contains only the directory DIR-11 410, and does not display FILE-1 412, DIR-10 408, or FILE-2 414.

Figure 5:
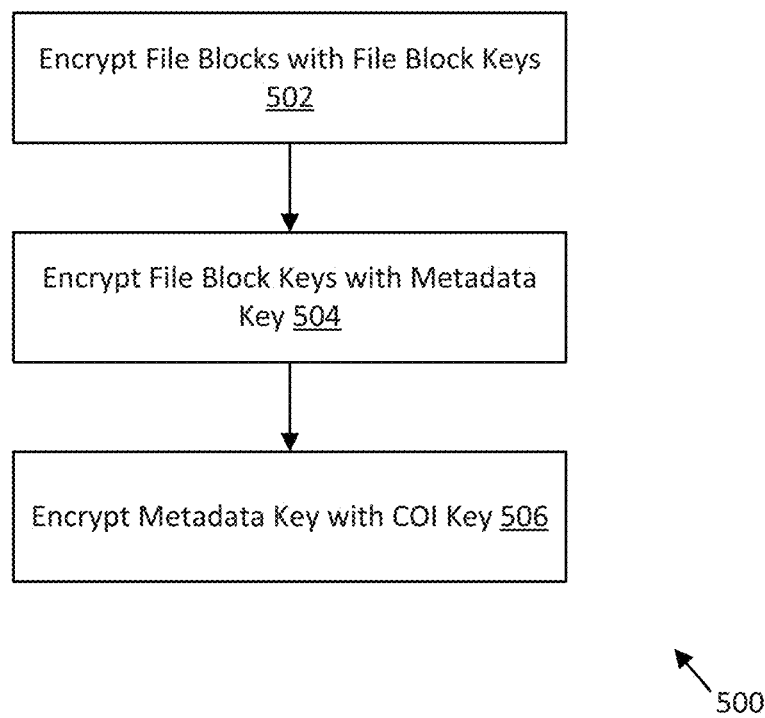
FIG. 5 is a flowchart of an example method for encrypting a file.

Referring now to FIG. 5, a flowchart depicting an example method 500 of encrypting a requested file endpoint that is stored in file storage is shown, in an example embodiment. The method 500 can be performed, for example, by a file system manager, e.g., file system manager 103 of FIG. 1, on a file storage system such as system 104. In a block encryption operation, the file server 102 generates random file block keys and uses those keys to encrypt each individual file block that forms a file. As described herein, each file is divided into file blocks of equivalent sizes, for example, 64 MB. The generated file block keys are stored in the file's metadata. The file block keys represent a first layer of encryption performed by the file server 102.

In a key encryption operation 504, the file server 102 generates a random metadata key to encrypt the metadata, including the file block keys stored therein. The metadata key represents a second layer of encryption performed by the file server 102.

In a metadata encryption operation 506, the file server 102 encrypts the metadata key for each COI to which the file belongs. For each of the file's COIs, the file server 102 encrypts the metadata key using a COI key obtained from the security appliance. In the context of the present disclosure, the COI key can, in some embodiments, be a key generated and managed using Stealth security technologies provided by Unisys Corporation of Blue Bell, Pa. In alternative embodiments, other types of keys useable as community of interest (COI) keys could be utilized as well.

Accordingly, several instances of encrypted metadata keys may be generated in metadata encryption operation 506. In an example, the metadata key of a file belonging to COI A and COI B is encrypted twice: once using a COI A key and once using a COI B key. Thus, in that example, two instances of encrypted metadata keys are generated.

Figure 6:
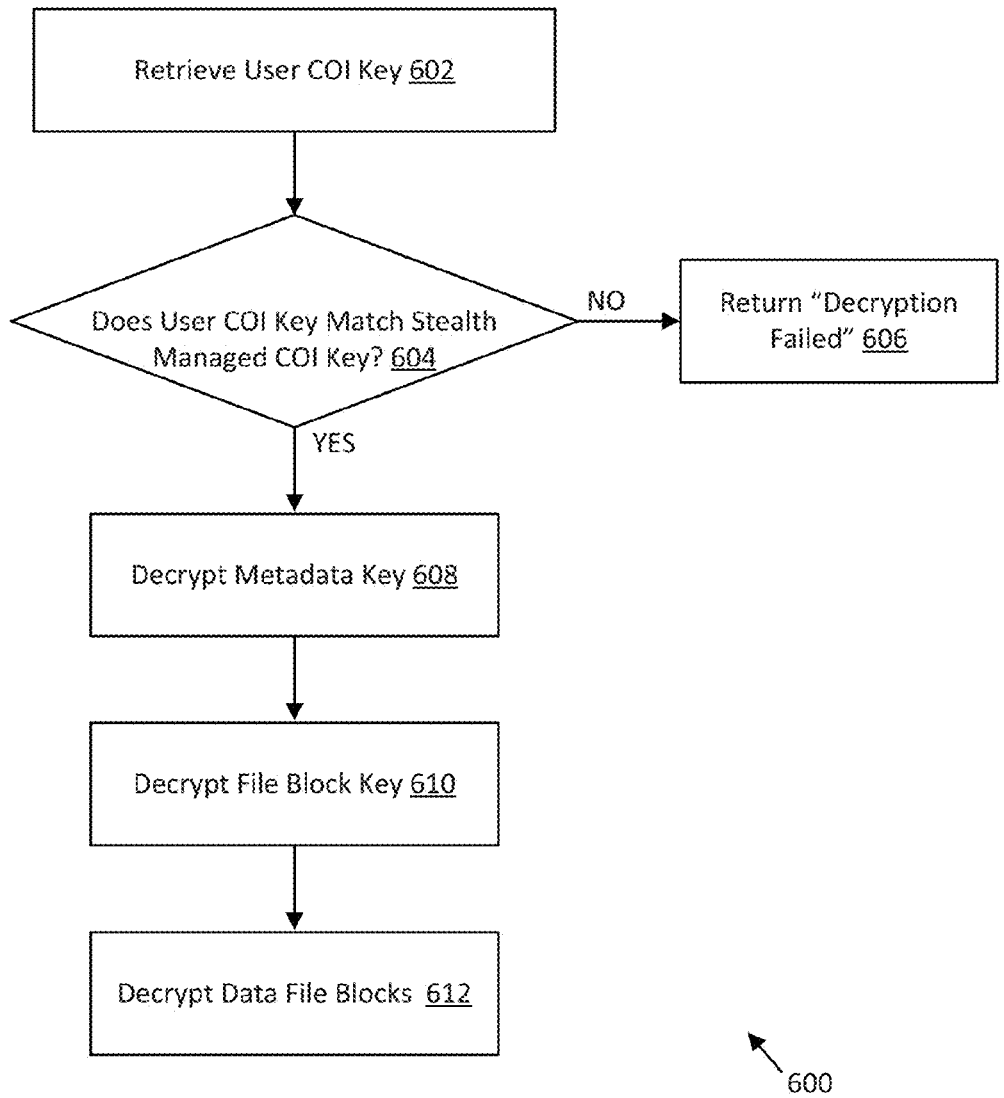
FIG. 6 is a flowchart of an example method for decrypting a file encrypted using the method provided in FIG. 5.

FIG. 6 is a flowchart of an example method 600 for decrypting a file encrypted using the method 500 provided in FIG. 5. In this example method 600, it is assumed that the file server has determined that the user has access to read the requested file endpoint (e.g., the file server 102 has performed methods 200 and 300 and has granted the user access to the requested file, as discussed above in connection with FIGS. 1-3).

In the embodiment shown, the example decryption method 600 includes a COI key retrieval operation 602 in which the file server 102 looks up the COI key stored in the user's COI credentials provided by the security appliance 106. As described herein, the user's COI credential can be included in an XML file that identifies each of the user's COIs. The user COI credential further includes a COI key associated with each of the user's COIs. The COI key can correspond to the COI key used by the file system manager 103 to encrypt the metadata key (e.g., if the user is in the COI to which access to the file is allowed) and is used to decrypt the metadata key that was previously encrypted using the COI key in step 506 of method 500. Accordingly, in COI key retrieval operation 602, the file server 102 looks up, in the user COI credential, the COI key associated with the COI of the requested file.

In key matching operation 604, the file server 102 determines whether the COI key matches a COI key associated with a file to be decrypted. If the COI key does not match any COI key associated with the file, the method 600 proceeds to a failure operation 606 in which the file server 102 returns a message indicating the decryption failed. If the COI key matches a COI key managed by the file system manager 103 and associated with the file to be decrypted, the method 600 proceeds to a metadata decryption operation 608 in which the file server 102 decrypts the metadata key. In a key decryption operation 610, the file server 102 decrypts each file block key with the decrypted metadata key and in a block decryption operation 612, the file server 102 decrypts each individual file block using the respective decrypted file block key. Accordingly, the user is provided access to the requested data.

The method and arrangement discussed in connection with FIG. 6 allows a file system to encrypt file blocks using a key of a particular length or security type, while allowing users to have COI keys of a different length or security type. For example, a key used to encrypt a file block may be used a predetermined number of times on a file block of a particular size before its encryption strength is weakened; as such, use of a metadata key allows a user to define a plurality of different file block keys useable to encrypt different file blocks, with the metadata key mapped to file block keys and COI keys on a one-to-many basis.

Figure 7:
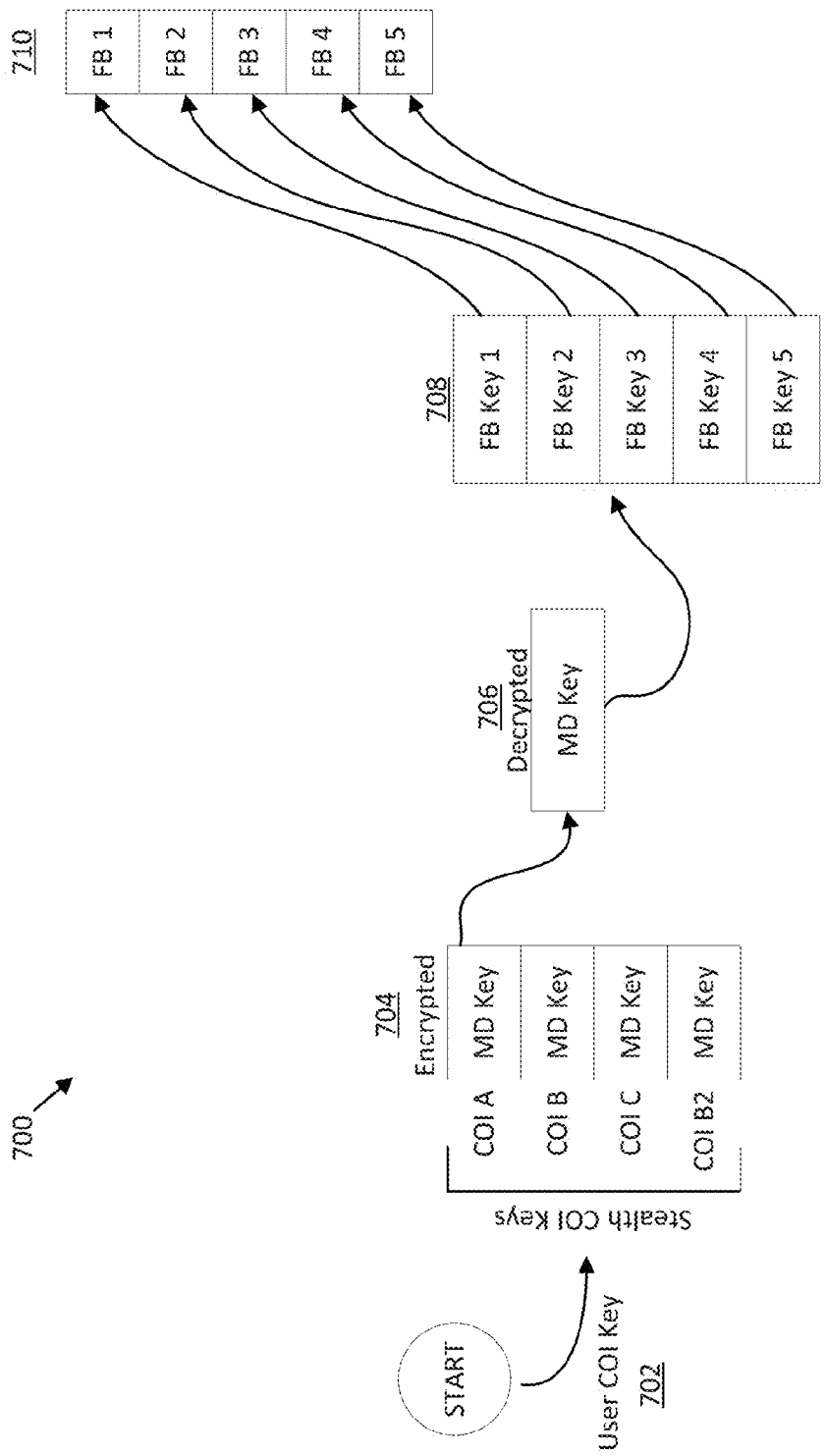
FIG. 7 is a block diagram illustrating the general file decryption process as described with reference to FIG. 6.

FIG. 7 is a block diagram illustrating the general file decryption process as described with reference to FIG. 6, and in the context of the system described in FIG. 1. As described herein, the disclosed system augments existing file structures with several layers of data encryption. During decryption, the COI key is obtained from the user COI credential and is used to search for the COI key matching that COI key that is used to encrypt the metadata key stored in the file server at 704. As described herein, for each user COI associated with a file (i.e., each group of individuals defined to have access to a file), a COI key is used to encrypt a separate instance of the metadata key. Accordingly, the file server 102 obtains the COI key 702 from the user COI credential and decrypts the metadata key originally encrypted using that COI key. For example, a file belonging to COI A, COI B, and COI C will have three separate encrypted instances of metadata keys, wherein each metadata key is encrypted by one of the COI keys associated with COI A, COI B, and COI C as shown in 704. In example embodiments, the stealth appliance 104 periodically updates the COI key for security purposes. In some embodiments, this periodic basis is a monthly basis and in alternative embodiments, this periodic basis occurs more or less frequently. When the COI key is updated, the file server 102 re-encrypts the metadata key using the updated COI key, without requiring a re-encryption of the remaining encrypted keys. As illustrated in 704, the COI B2 entry represents the updated COI B key that is used to re-encrypt the metadata key. Accordingly, in this example embodiment, the COI B key is no longer a valid key (once reencryption occurs using a COI B2 key).

In an example, the file system manager 103 of file server 102 obtains a COI A key in the user credential and looks up the corresponding COI A key in 704. As described with reference to FIG. 6, the file system manager 103 of file server 102 determines whether the COI A key matches the COI A key in the key structure of the file system manager. If a match occurs, the metadata key encrypted by the COI A key is decrypted in 706. The file system manager 103 of file server 102 uses the decrypted metadata key to decrypt the file block keys at 708 that are each used to encrypt individual file blocks associated with the file. Accordingly, the decrypted file blocks in 710 are accessed.

Referring to FIG. 7 generally, it is noted that, although the file blocks are discussed herein as being stored locally and directly accessed by the file system manager 103, other arrangements are possible as well, in which one or more such file blocks can be managed indirectly, and a separate key structure can be used to store encrypted file block keys that are accessed using the metadata key. Furthermore, although the present disclosure describes methods for decrypting file block data, access of that file block data occurs by way of file metadata managed in a directory structure, which maps filenames to file metadata defining the blocks in which a file is stored. Details regarding storage of files in file blocks, and mechanisms for distributing such files through file blocks and accessing file blocks based on filenames, are described in copending U.S. patent application Ser. No. 13/726,721, entitled "Equalizing Wear on Storage Devices Through File System Controls", filed on Dec. 26, 2012, the disclosure of which is hereby incorporated by reference in its entirety.

Figure 8:
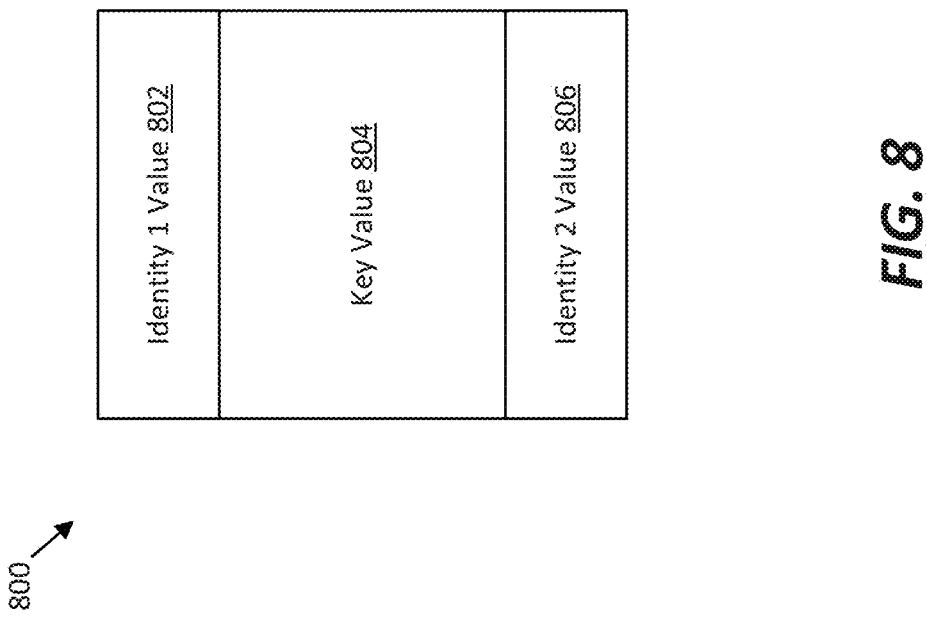
FIG. 8 is a block diagram illustrating parts of a key as described in FIGS. 5-7.

FIG. 8 is a block diagram illustrating parts of a key as described in FIGS. 5-7. As an initial matter, in embodiments, the file server 102 confirms whether the file decryption was successful by cascading known identity values provided in the decrypting key through each layer of decryption. In such an embodiment, each decryption determines the check for the next decryption. In this way, the file server 102 can log a failed access attempt; and return to the caller either a message indicating the decryption failed or returning to the caller a decoy or ambiguous message indicating the file is not available. A hacker may benefit by returning a message indicating that the decryption failed.

As shown in this example, each COI key, metadata key, and file block key is made up of three parts: an identity 1 value 802, the key itself 804, and an identity 2 value 806 of its successor key. According to aspects of the present disclosure, the identity 1 value 802 is at least a 64-bit integer value, which has no human readable meaning. As described with reference to FIG. 9, the file server 102 compares the identity 2 value 804 of the decrypting key with the identity 1 value 802 of the key with which it seeks to decrypt. Matching values indicate the decryption was successful, and as such the files system may continue processing, for example to obtain and/or decrypt the next key or data block associated with the key.

Figure 9:
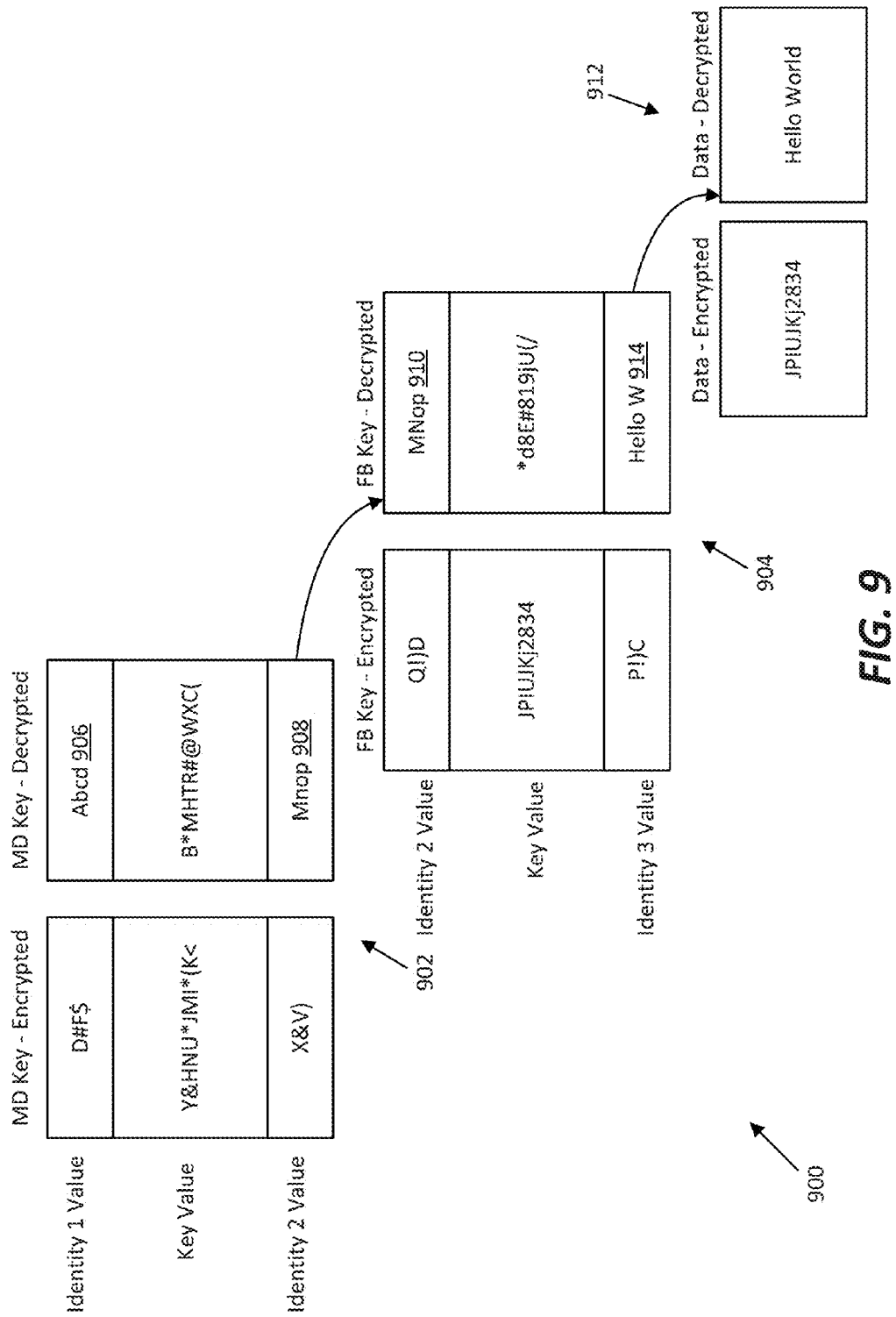
FIG. 9 is a block diagram illustrating a process used by the file server to determine that data encryption was successful.

FIG. 9 is a block diagram illustrating a process used by the file server to determine that data encryption was successful. Two keys are shown: the metadata key 902 and the file block key 904. As illustrated, each key has both an encrypted version and a decrypted version. In this example, after the file server 102 decrypts the metadata key 902 using the COI key, the file server 102 compares the COI identity 2 value of the COI key (not shown) used to decrypt the metadata key with the identity 1 value 906 (ABcd). If the identity values match, the decryption was successful. Otherwise, the file server 102 logs the unsuccessful decryption attempt, and returns to the caller a failure message indicating the decryption failed or returning to the caller a decoy or ambiguous message indicating the file is not available. A hacker may benefit by returning a message indicating that the decryption failed; accordingly, a "failure message" can indicate any type of file read or access failure or generic system failure.

After the file server 102 decrypts the file block key 904 with the decrypted metadata key 902, the file server 102 compares the identity 2 value 908 (MNop) of the metadata key 902 with the identity 1 value 910 (MNop) of the file block key 904. In this example, the values 'MNop' match. Matching values indicate the decryption was successful.

In the embodiment shown, the file server 102 uses the decrypted file block key 904 to decrypt the data file block 912. As shown, the identity 3 value 914 of the file block key 904 (Hello W) represents a decrypted version of a subset of the data "Hello World." In this example, the file server 102 compares the identity 3 value 914 with the data 912 and determines a match. Matching values indicate the decryption was successful.

In this example, the file server 102 uses some contents (i.e., "Hello W") of the data itself as the identity 3 value 914. Using some form of decrypted content of the data file block 912 may aid hackers attempting to decrypt the data. Accordingly, in alternative embodiments, the file server 102 may use a hash or other digest method on data block 912 to create a signature for the identity 3 value 914 of file block key 904. In such an example embodiment, the identity 3 value 914 of the file block key 904 may be represented by a signature value 1846. Thus, the data file block 912 is represented by a corresponding identity 3 value of 1846. Accordingly, the file server 102 compares the signature value (1846) of the identity 3 value 914 to the identity value (1846) of the data file block 912. In this example, the values match and the file server 102 returns the decrypted data block 912.

It is noted that once a file block key 904 is decrypted, it can be used to perform any of a number of read, write, or execute operations on the decrypted data block 912. For example, it can be used to decrypt data that is identified in a read request, or to encrypt data for storage in the case of a write request.

Figure 10:
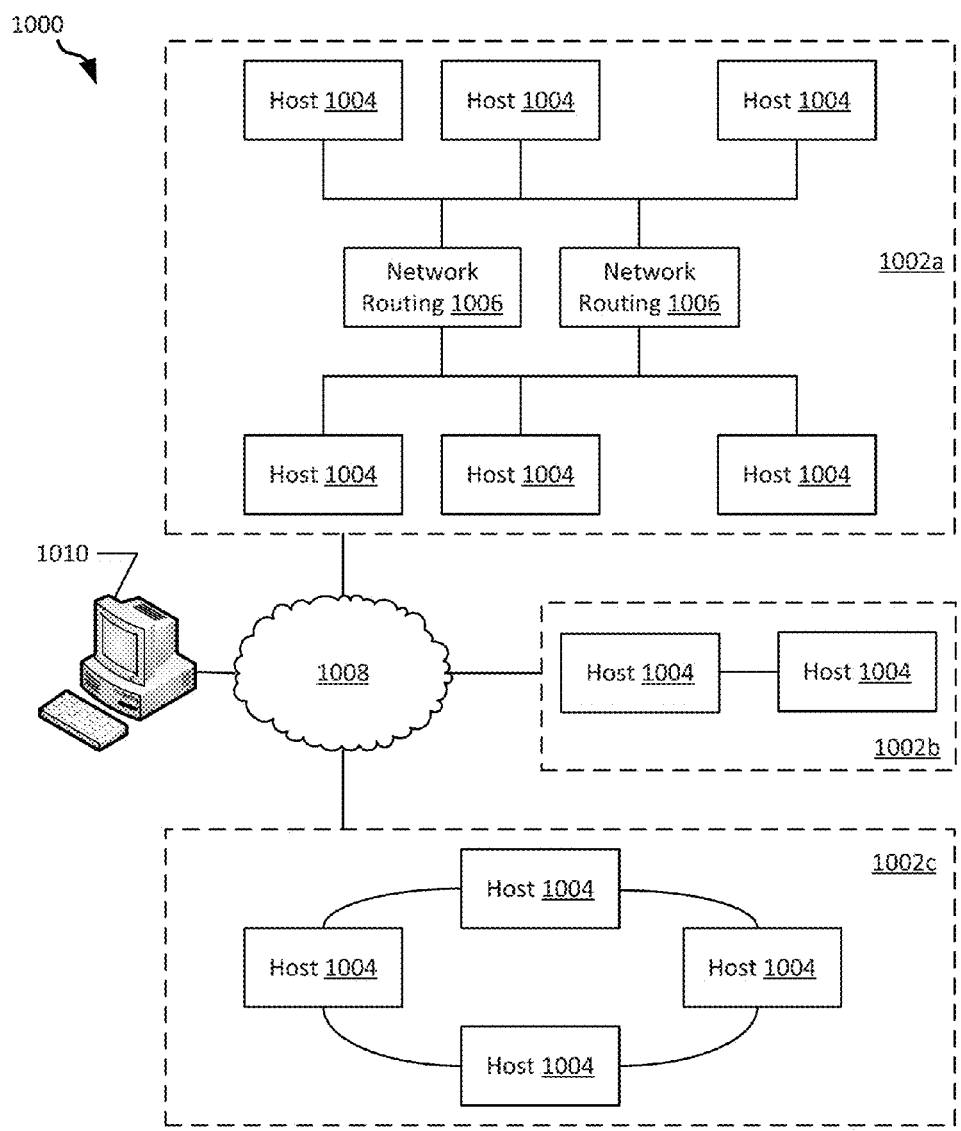
FIG. 10 illustrates a distributed host system in which aspects of the present disclosure can be implemented.
Figure 11:
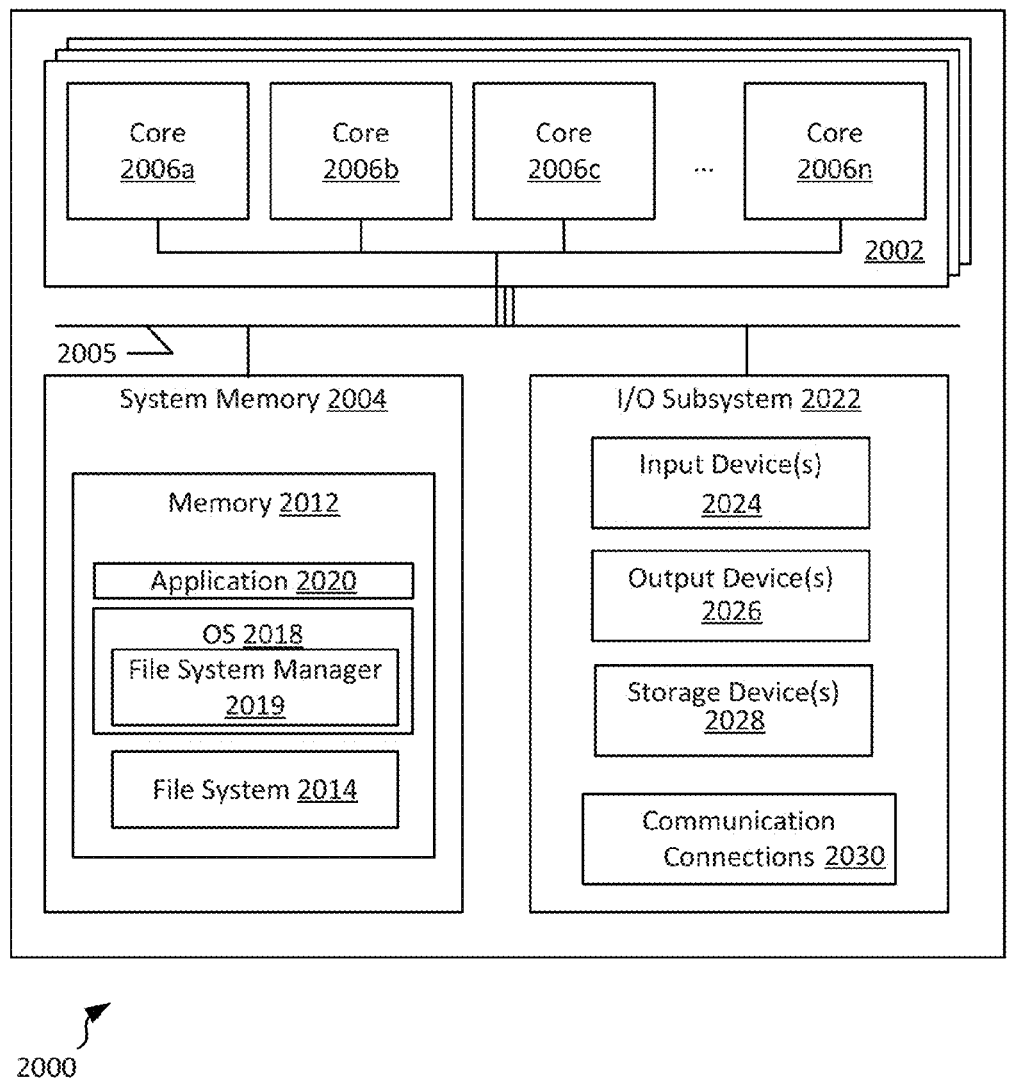
FIG. 11 illustrates an example block diagram of a host computing system useable to implement the file server.

Referring now to FIGS. 10-11, example computing system arrangements are depicted in which aspects of the present disclosure can be implemented. In particular, the computing system arrangements represent networks and computing systems that can be used to implement a client device, a file server, and/or a security appliance as discussed above in connection with FIG. 1, and which can implement the various methods and systems discussed herein for providing data security within a file system manager. As illustrated in FIG. 10, a system 1000 in which the systems of the present disclosure can be implemented is shown. The system 1000 is, in the embodiment shown, distributed across one or more locations, shown as locations 1002a-c. These can correspond to locations remote from each other, such as a server owned or controlled by an organization, a third-party managed computing cluster used in a "cloud" computing arrangement, or other local or remote computing resources residing within a trusted grouping. In the embodiment shown, the locations 1002*a-c* each include one or more host systems 104. The host systems 1004 represent host computing systems, and can take any of a number of forms. For example, the host systems 1004 can be server computing systems having one or more processing cores and memory subsystems and are useable for large-scale computing tasks. In one example embodiment, a host system 1004 can be as illustrated in FIG. 11.

As illustrated in FIG. 10, a location 1002 within the system 1000 can be organized in a variety of ways. In the embodiment shown, a first location 1002*a* includes network routing equipment 1006, which routes communication traffic among the various hosts 1004, for example in a switched network configuration. Second location 1002*b* illustrates a peer-to-peer arrangement of host systems. Third location 1002*c* illustrates a ring arrangement in which messages and/or data can be passed among the host computing systems themselves, which provide the routing of messages. Other types of networked arrangements could be used as well.

In various embodiments, at each location 1002, the host systems 1004 are interconnected by a high-speed, high-bandwidth interconnect, thereby minimizing latency due to data transfers between host systems. In an example embodiment, the interconnect can be provided by an Infiniband switched fabric communications link; in alternative embodiments, other types of interconnect technologies, such as Fibre Channel, PCI Express, Serial ATA, or other interconnect could be used as well.

Among the locations 1002*a-c*, a variety of communication technologies can also be used to provide communicative connections of host systems 1004 at different locations. For example, a packet-switched networking arrangement, such as via the Internet 1008, could be used. Preferably, the interconnections among locations 1002*a-c* are provided on a high-bandwidth connection, such as a fiber optic communication connection.

In the embodiment shown, the various host systems 1004 at locations 1002*a-c* can be accessed by a client computing system 1010. The client computing system 1010 can be any of a variety of desktop or mobile computing systems, such as a desktop, laptop, tablet, smartphone, or other type of user computing system. In alternative embodiments, the client computing system 1010 can be another host system 1004 at the same or a different location, or a virtual machine located either locally to or remotely from a file server implementing aspects of the present disclosure. Furthermore, any of the host systems or client systems discussed herein, whether a hardware system or virtualized system hosted by such a hardware system, can be used to implement a security appliance, such as security appliance 106 of FIG. 1.

It is noted that, in various embodiments, different arrangements of host systems 104 within the overall system 1000 can be used; for example, different host systems 104 may have different numbers or types of processing cores, and different capacity and type of memory and/or caching subsystems could be implemented in different ones of the host system 1004. Furthermore, one or more different types of communicative interconnect technologies might be used in the different locations 1002*a-c*, or within a particular location.

Referring to FIG. 11, an example block diagram of a host computing system 2000 useable to implement the systems disclosed herein, is shown. The host computing system 2000 can, in some embodiments, represent an example of a host system 1004 of FIG. 10, useable within the system 1000; as such, in various embodiments, the host computing system 2000 can represent or host a virtualized version of any of the file server 102, client system 104, or security appliance 106 of FIG. 1.

In the embodiment shown, the host computing system 2000 includes one or more processing subsystems 2002, communicatively connected to a system memory 2004. Each processing subsystem 2002 can include one or more processing cores 2006, shown as processing cores 2006*a-n*. Each processing core can, in various embodiments, include one or more physical or logical processing units capable of executing computer-readable instructions. In example embodiments, the processing cores 2006*a-n* can be implemented using any of a variety of x86 instruction sets, such as x86, x86-64, or IA64 instruction set architectures. In alternative embodiments, other instruction set architectures, such as ARM, MIPS, Power, SPARC, or other types of computing set architectures could be used.

In addition, each of the processing subsystems 2002 can include one or more card-based processing subsystems including a plurality of sockets for supporting execution cores 2006*a-n*, or alternatively can support a socket-based or mounted arrangement in which one or more execution cores are included on a single die to be mounted within the host computing system 2000. Furthermore, in the embodiment shown, a plurality of processing subsystems 2002 can be included in the host computing system, thereby providing a system in which one or more cores could be allocated to different partitions hosted by the same computing hardware; in alternative embodiments, a single processing subsystem including one or more processing cores 2006*a-n* could be included in the host computing system 2000, and that processing subsystem 2002 could be implemented without separation from system memory 2004 by a card-based implementation.

As illustrated, the system memory 2004 is communicatively interconnected to the one or more processing subsystems 2002 by way of a system bus 2005. The system bus is largely dependent upon the architecture and memory speed support of the processing subsystems with which it is implemented; although example systems provide different frequencies and throughputs of such system buses, in general the bus system between processing subsystems 2002 and the system memory is a low-latency, high bandwidth connection useable to rapidly retrieve data from the system memory 2004. System memory 2004 includes one or more computer storage media capable of storing data and/or instructions in a manner that provides for quick retrieval of such data and/or instructions by a corresponding processing core 2006. In different embodiments, the system memory 2004 is implemented in different ways. For example, the memory 2004 can be implemented using various types of computer storage media.

In the embodiment shown, the memory 2004 can include a memory section 2012 dedicated to a file server. That memory section 2012 can include a file system 2014, an operating system 2018, and optionally one or more applications 2020.

In example embodiments, the memory section 2012 can be a dedicated section of memory 2004 that is assigned to a particular virtual machine partition that is designated to act as a file server, such as file server 102. The memory section 2012 can therefore also include monitor software (not shown) which hosts the partition, and can be hosted across a plurality of processing cores 2006, and can have either dedicated or shared I/O devices (shared with other virtualized partitions) from within the I/O subsystem, described below. Example partitioning mechanisms, and additional details regarding partitioning within such a computing arrangement, are described in copending U.S. patent application Ser. No. 14/133,803, entitled "INTERCONNECT PARTITION BINDING API, ALLOCATION AND MANAGEMENT OF APPLICATION-SPECIFIC PARTITIONS", the disclosure of which is hereby incorporated by reference in its entirety.

The host computing device includes an I/O subsystem 2022 that includes one or more input devices 2024, output devices 2026, and storage devices 2028. The input devices 2024 can include, for example, a keyboard, a mouse, a pen, a sound input device, a touch input device, etc. Output device(s) 2026 can include, for example, a display, speakers, a printer, etc. The aforementioned devices are examples and others may be used. Storage devices 2028 store data and software instructions not directly accessible by the processing subsystems 2002. In other words, the processing subsystems 2002 perform an I/O operation to retrieve data and/or software instructions from the storage device 2028. In various embodiments, the secondary storage device 2028 includes various types of computer storage media. For example, the secondary storage device 2028 can include one or more magnetic disks, magnetic tape drives, optical discs, solid state memory devices, and/or other types of computer storage media.

The I/O subsystem 2022 further includes one or more communication connections 2030. The communication connections 2030 enable the computing device 1000 to send data to and receive data from a network of one or more such devices. In different embodiments, the communication connections can be implemented in different ways. For example, the communications connections can include a network interface card implementing an Ethernet interface, a token-ring network interface, a fiber optic network interface, a wireless network interface (e.g., Wi-Fi, WiMax, etc.), or another type of network interface. The communication connections 232 can also include an inter-system communication connection for direct data communication between computing systems, such as a Infiniband switched fabric communications link, or a Fibre Channel, PCI Express, Serial ATA, or other type of direct data communication link.

As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, DDR4 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least some tangible, non-transitory media and can, in some embodiments, exclude transitory wired or wireless signals. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as Wi-Fi, acoustic, radio frequency (RF), infrared, and other wireless media. In accordance with the present disclosure, the term computer readable media as used herein may include computer storage media, but generally excludes entirely transitory embodiments of communication media, such as modulated data signals.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIGS. 10 and 11 may be integrated onto a single integrated circuit. Such an SOC device may include one or more processing units, graphics units, communications units, system virtualization units and various application functionality all of which are integrated (or "burned") onto the chip substrate as a single integrated circuit. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Although particular features are discussed herein as included within a host computing system 2000, it is recognized that in certain embodiments not all such components or features may be included within a computing device executing according to the methods and systems of the present disclosure. Furthermore, different types of hardware and/or software systems could be incorporated into such an electronic computing device.

Referring to FIGS. 1-11 generally, it is noted that the present disclosure has a number of advantages over existing systems, in particular relative to storage security and access controls. In particular, by applying community-of-interest-based security to files and directories and managing such COI-based access at a file system manager, security within a system is enhanced by obscuring files from users who do not have access to those files. Additionally, the present disclosure provides for simplified re-encryption and association of files with different COIs, thereby allowing a user of a security appliance to easily change the users or user groups associated with a particular file or directory without requiring re-encryption of data blocks associated with that file or directory. Furthermore, the incorporation of such security features are made, in the present disclosure, without requiring replacement or removal of existing POSIX-based security features for read/modify access controls to files or directories, thereby simplifying integration of such additional security in a file system manager. Additional advantages are apparent as well from the present description and the claims as appended hereto.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A method for processing file system requests using a file server, the method comprising:
   receiving a file system request and a user identification associated with the file system request from a caller, wherein the file system request includes a path identifying an existing file system structure in an existing directory;
   obtaining a community of interest (COI) credential associated with the user identification;
   identifying the existing file system structure in the path;
   providing access to the existing directory, and returning a handle to the directory to the caller based on an assessment that the caller has permission to access the existing directory;
   determining whether at least one COI included in the COI credential matches at least one COI associated with the existing file system structure; and
   determining whether at least one COI included in the COI credential matches at least one COI associated with the existing file system structure; and
   assessing visibility of the existing file to the caller based on a COI associated with the existing file system structure; wherein:
   if at least one COI included in the COI credential matches at least one COI associated in the existing file system structure includes assessing user access permission to the existing file and decrypting the content with the COI credential; and
   if no COI included in the COI credential matches a COI associated in the existing file, assessing visibility of the existing file includes returning an indication, to the caller, that the file does not exist;
   wherein the COI credential comprises a CIO key, a metadata key, and a file block key.

2. The method of claim 1, further comprising, based on an assessment that the caller has permission to access the file, providing access to the existing file system structure.

3. The method of claim 2, wherein the file system structure comprises an existing file, and wherein providing access to the existing file comprises returning a file handle to the existing file to the caller.

4. The method of claim 1, wherein receiving a file system request comprises receiving at least one of a file read request or a file write request.

5. The method of claim 1, wherein the file system structure comprises a symbolic link to a file.

6. The method of claim 1, wherein receiving a file system request comprises receiving a directory access request.

7. The method of claim 1, wherein the file server obtains the COI credential from a stealth appliance that is communicatively connected to the file server.

8. A system for processing file system requests, comprising:
   a file server having a file storage and a file system manager, the file storage for storing one or more directories and files;
   wherein the file system manager performs the steps of:
   receiving a file system request and a user identification associated with the file system request from a caller, wherein the file system request includes a path identifying an existing file system structure an existing directory;
   obtaining, from a stealth appliance that is separate from the file server, a community of interest (COI) credential associated with a user identification;
   identifying the file system structure in the path;
   providing access to the existing directory, and returning a handle to the directory to the caller based on an assessment that the caller has permission to access the existing directory;
   determining whether at least one COI included in the COI credential matches a COI associated with the file system structure, wherein a content stored under the directory is encrypted with the COI credential;
   assessing visibility of the file to the caller based on the COI associated with the file system structure; wherein:
   if at least one COI included in the COI credential matches a COI associated in the file system structure, assessing user access permission to the file and decrypting the content with the COI credential; and
   if no COI included in the COI credential matches a COI associated in the file system structure, returning an indication, to the caller, that the file does not exist;
   wherein the COI credential comprises a CIO key, a metadata key, and a file block key.

9. The system of claim 8, wherein the caller comprises a user application.

10. The system of claim 9, wherein the user application is located on the file server.

11. The system of claim 9, wherein the user application is located on a client device remote from the file server.

* * * * *